(12) United States Patent
Matsui

(10) Patent No.: US 6,969,566 B2
(45) Date of Patent: Nov. 29, 2005

(54) BATTERY PACK

(75) Inventor: Takatoshi Matsui, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 436 days.

(21) Appl. No.: 10/257,997

(22) PCT Filed: Feb. 6, 2002

(86) PCT No.: PCT/JP02/00992

§ 371 (c)(1),
(2), (4) Date: Oct. 15, 2002

(87) PCT Pub. No.: WO02/067347

PCT Pub. Date: Aug. 29, 2002

(65) Prior Publication Data
US 2003/0138690 A1 Jul. 24, 2003

(30) Foreign Application Priority Data
Feb. 20, 2001 (JP) ............................ 2001-044001

(51) Int. Cl.[7] .......................................... H01M 10/48
(52) U.S. Cl. .......................... 429/92; 429/99; 429/100; 320/106; 320/112; 320/132; 320/134; 320/136
(58) Field of Search ............................ 429/92, 99, 100; 320/106, 112, 132, 134, 136

(56) References Cited

U.S. PATENT DOCUMENTS

| | | | | |
|---|---|---|---|---|
| 5,994,878 A | * | 11/1999 | Ostergaard et al. | 320/132 |
| 6,137,265 A | * | 10/2000 | Cummings et al. | 320/133 |
| 6,215,274 B1 | * | 4/2001 | Dotzler | 320/106 |
| 6,456,948 B1 | * | 9/2002 | Lim | 702/63 |

FOREIGN PATENT DOCUMENTS

| | | |
|---|---|---|
| EP | 936719 | 8/1999 |
| JP | 09-199096 | 7/1997 |
| JP | 2002-025632 | 1/2002 |

* cited by examiner

Primary Examiner—Bruce F. Bell
(74) Attorney, Agent, or Firm—Jordan and Hamburg LLP

(57) ABSTRACT

To make a battery pack (2) capable of connection over a communication network for the sake of maintenance of the battery pack (2). The battery pack (2) is provided with a network interface (12) given a unique IP address, which is connected to a LAN along with a network interface (11) of a PC body (1). Even if the PC body (1) is suspended, the battery pack (2) can be accessed over the LAN. A computer for maintenance, arranged on the LAN, can thus access the battery back (2) to acquire the operating status of a rechargeable battery (3) and data stored in a memory (8), such as a serial number, thereby performing maintenance.

24 Claims, 1 Drawing Sheet

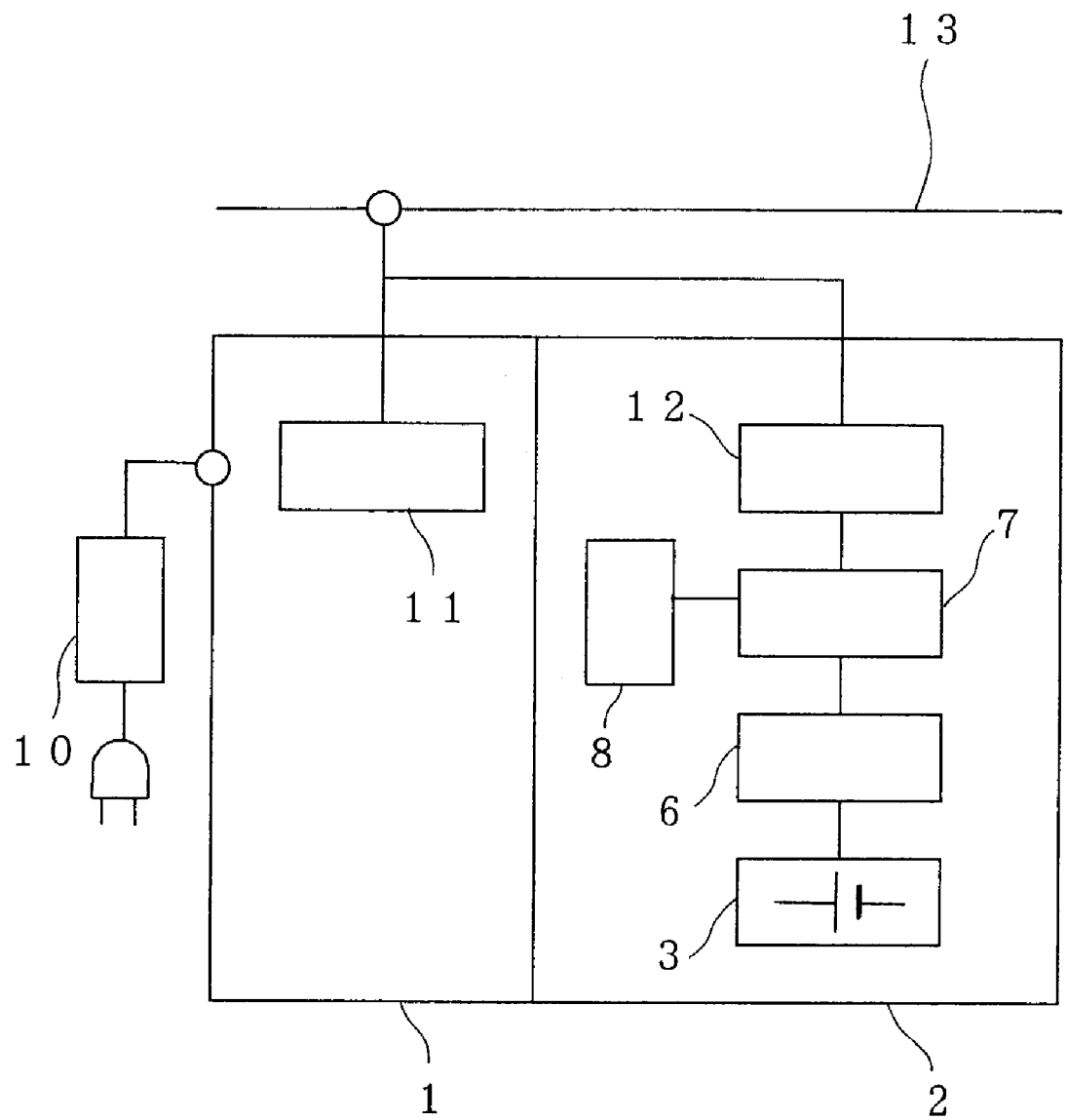

BATTERY PACK

TECHNICAL FIELD

The present invention relates to a battery pack having the function of enabling communication over a network.

BACKGROUND ART

Battery packs for use as power sources in carrying portable personal computers (hereinafter, referred to as portable PCs) have a battery charge displaying function and a battery protecting function. Power management systems such as a smart battery system are constituted in which data including the battery voltage and the battery charge are output to PC bodies through communication buses (such as SMBus) and the PC bodies control the battery packs. In offices etc., portable PCs loaded with such battery packs are connected to the LAN so that they can acquire and update necessary information from a management computer for performing maintenance.

Since the information on the battery packs is transmitted to the PC bodies through the communication buses, the management computer can acquire the information on the battery packs from the portable PCs. The information on the battery packs includes data such as the dates of manufacture, serial numbers, battery capacities, and battery voltages. From the data acquired, the management computer identifies replacement times, available models for capacity enhancement, etc.

The information on the battery packs is, however, in a format solely for communication between the battery packs and the portable PCs. Thus, it must be converted into data formats recognizable on the network by the portable PCs, and the management computer cannot acquire the information on the battery packs unless the portable PCs are in operation. In addition, the information acquisition intended for maintenance and the like is performed at nighttime so as not to interfere with any business operation that uses computers including the portable PCs. At nighttime, the portable PCs are often powered OFF, which precludes the information acquisition.

It is an object of the present invention to provide a battery pack which has a unique address and network communication means so that the battery pack can establish connection with the network by itself.

DISCLOSURE OF THE INVENTION

To achieve the above-mentioned object, a battery pack according to the present invention includes: a rechargeable battery; battery management means for managing a charge/discharge status of the rechargeable battery; storing means for storing firmware and required data; and communication means having a unique address for identifying the battery pack, and the communication means using a predetermined network protocol.

According to the configuration described above, the battery pack contains such communication means as a LAN interface that has a unique address of TCP/IP or the like and can establish direct connection to a network. Consequently, a management computer on the network can retrieve the information on the battery pack even if the equipment loaded with the battery pack, such as a portable PC, is not in operation. The management computer connected to the network can perform maintenance of the battery pack as needed.

The communication means in the foregoing configuration may have a communication facility over a network that is constructed by means of power-line carrier communication using power lines. In the configuration capable of communication connection to the network for the power-line carrier communication, the power lines can be used as communication lines without connecting other lines for the communication connection, since a charger for charging the rechargeable battery of the battery pack or an AC adapter of the computer loaded with the battery pack is in connection with the interior power lines.

BRIEF DESCRIPTION OF THE DRAWING

FIG. 1 is a block diagram showing the configuration of a battery pack according to an embodiment of the present invention and a PC loaded with the same.

BEST MODE FOR CARRYING OUT THE INVENTION

Hereinafter, an embodiment of the present invention will be described with reference to the accompanying drawing for the sake of understanding of the invention. Incidentally, the embodiment shown below is merely an example of embodiment of the present invention, and by no means intended to limit the technical scope of the invention.

Taking a portable personal computer (portable PC) for use in an office where LAN is built, as an example, the present embodiment shows a battery pack as a battery power source thereof.

As shown in FIG. 1, a PC body 1 of the portable PC is configured such that it can run on direct current power supplied from a loaded battery pack 2 or direct current power supplied from an AC adapter 10 selectively. A rechargeable battery 3 of the battery pack 2 is configured to be charged by the power supplied from the AC adapter 10. In predetermined places such as in the office, the PC body 1 is used with the AC adapter 10 connected to commercial power, and is connected to the LAN as a client. It can also be used in any places as moved from the predetermined places, taking advantage of the portability of having the battery pack 2.

For the connection to the LAN, the PC body 1 and the battery pack 2 are provided with TCP/IP network interfaces (communication means) 11 and 12 to which unique IP addresses are given, respectively. The PC body 1 and the battery pack 2 perform sending/receiving of data therebetween as to power source management, and are connected to a LAN connection cable 13.

The battery pack 2 includes: the rechargeable battery 3 which is a plurality of lithium-ion rechargeable batteries combined to obtain a required voltage and capacity; a protection circuit 6 which protects this rechargeable battery 3 from overcharge, overdischarge, overcurrent, and so on; the network interface 12; a microcomputer 7 which detects the operating status of the rechargeable battery 3 such as the remaining capacity, and controls communication through the network interface 12; and a memory (storing means) 8 which contains firmware and inherent data including the manufacturer, a serial number, and charging conditions.

When the battery pack 2 is provided with the network interface 12 given a unique IP address as mentioned above, it is impossible for the address space available by current IPv4 to assign an address to each of the battery packs 2 on respective LAN-connected portable PCs. Nevertheless, the application of IPv6 having an extended 128-bit address space allows battery packs 2 having unique IP addresses.

When the battery pack 2 is thus provided with the network interface 12 for LAN connection, it follows that the battery pack 2 has its own communication facility and is capable of communication connection to computers connected on the network even if the PC body 1 is not in operation. That is, a management computer arranged on the LAN, in charge of maintenance, can acquire data on the operating statuses of the battery packs 2 mounted on a number of portable PCs connected to the LAN even when the respective PC bodies 1 are not in operation. Consequently, it becomes possible to carry out the data acquisition for maintenance at nighttime when the individual PCs are powered OFF, without interfering with business operations.

Besides, TCP/IP is the standard protocol on the Internet, and various services over the Internet are premised on TCP/IP, which is hence an indispensable network protocol even on LANs. This means no particular specification on the connecting computer, so that an arbitrary computer on the network can acquire the data on the battery pack 2.

Moreover, this IP address is granted at the stage of manufacture by the manufacturer of the battery pack, and can thus be treated as a serial number. In the event of defects in a given manufacturing lot, it is possible to find out the IP addresses of the corresponding battery packs over the network and to transmit necessary information.

In many of LAN connections, as shown in the foregoing configuration, the network is constructed with LAN connection cables 13. It is possible, however, to construct a LAN without using LAN connection cables 13, but by means of power-line carrier communication which utilizes interior power lines of commercial power as the channels for signal transmission. Computers receive their operating power from interior power lines via line connectors, or outlets, of the interior power lines. Hence, using the line cords through which the operating power is input from the outlets, a power-line-carrier-based LAN from PC bodies 1 can be constructed through the line cords with the interior power lines as the signal transmission channels.

In the foregoing configuration, however, the connection of the PC body 1 to the interior power lines is established by the AC adapter 10 via an outlet. The AC adapter 10 has a transformer etc. that can interrupt the signal transmission channel, and thus is incapable of signal transmission.

This problem can be solved by the use of an AC adapter 10 that is provided with a signal transmission channel. That is, the AC adapter 10 bypasses its components that interrupt the signal transmission channel, such as the transformer, to connect the LAN terminals of the PC body 1 and the battery pack 2 to the power lines.

INDUSTRIAL APPLICABILITY

As has been described above, the battery pack of the present invention includes the communication means which has a unique address and can establish direct connection to a network. The information on the battery pack is thus retrieved over the network even if the equipment loaded with that battery pack is not in operation, so that a management computer connected to the network performs maintenance of the battery pack as needed.

What is claimed is:

1. A battery pack comprising:
   a rechargeable battery;
   battery management means for managing a charge/discharge status of said rechargeable battery;
   storing means for storing firmware and required data; and
   communication means having a unique address for identifying the battery pack, said communication means using a predetermined network protocol.

2. The battery pack according to claim 1, wherein said communication means has a communication facility configured in effect power-line carrier communication.

3. A battery pack for insertion in and powering of a PC, comprising:
   a rechargeable battery;
   a battery management controller for managing a charge/discharge status of said rechargeable battery;
   storing means for storing firmware and required data accessible by said battery management controller; and
   communication means, responsive to said battery management controller, having a unique address for identifying the battery pack and effecting network communication over a network external to said PC using a predetermined network protocol.

4. The battery pack of claim 3 wherein said communications means is configured to effect network communications independent of an operating status of said PC.

5. The battery pack of claim 4 wherein said predetermined network protocol is TCP/IP.

6. The battery pack of claim 5 wherein said unique address is assigned at manufacture of the battery pack.

7. The battery pack of claim 4 wherein said predetermined network protocol is IPv6 permitting 128-bit addresses for said unique address.

8. The battery pack of claim 7 wherein said unique address is assigned at manufacture of the battery pack.

9. The battery pack of claim 3 wherein said communications means is configured to effect network communications when said PC is powered off.

10. The battery pack of claim 9 wherein said predetermined network protocol is TCP/IP.

11. The battery pack of claim 10 wherein said unique address is assigned at manufacture of the battery pack.

12. The battery pack of claim 9 wherein said predetermined network protocol is IPv6 permitting 128-bit addresses for said unique address.

13. The battery pack of claim 12 wherein said unique address is assigned at manufacture of the battery pack.

14. A battery pack system for powering of a PC, comprising:
   a rechargeable battery;
   a battery management controller for managing a charge/discharge status of said rechargeable battery;
   storing means for storing firmware and required data accessible by said battery management controller; and
   communication means, responsive to said battery management controller having a unique address for identifying the battery pack and effecting network communication via power-line carrier communication over a network external to said PC using a predetermined network protocol.

15. The battery pack system of claim 14 wherein said communications means is configured to effect communications independent of an operating status of said PC.

16. The battery pack system of claim 15 wherein said communication means includes an AC adaptor having a signal transmission channel via which said power-line carrier communication is carried out.

17. The battery pack system of claim 16 wherein said communications means is configured to effect network communications when said PC is powered off.

18. The battery pack system of claim 17 wherein said predetermined network protocol is TCP/IP.

19. The battery pack system of claim 17 wherein said predetermined network protocol is IPv6 permitting 128-bit addresses for said unique address.

20. The battery pack system of claim 14 wherein said predetermined network protocol is TCP/IP.

21. The battery pack system of claim 14 wherein said predetermined network protocol is IPv6 permitting 128-bit addresses for said unique address.

22. The battery pack system of claim 14 wherein said communications means is configured to effect network communications when said PC is powered off.

23. The battery pack system of claim 22 wherein said predetermined network protocol is TCP/IP.

24. The battery pack system of claim 22 wherein said predetermined network protocol is IPv6 permitting 128-bit addresses for said unique address.

* * * * *